United States Patent
Yoshimura et al.

(10) Patent No.: US 12,464,517 B2
(45) Date of Patent: Nov. 4, 2025

(54) USER EQUIPMENTS AND METHODS FOR DETERMINING TIME-FREQUENCY RESOURCE SET FOR ENHANCED DUPLEX OPERATION

(71) Applicant: SHARP KABUSHIKI KAISHA, Sakai (JP)

(72) Inventors: Tomoki Yoshimura, Camas, WA (US); Zhanping Yin, Vancouver, WA (US); Jana Marie Blust, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 463 days.

(21) Appl. No.: 17/728,014

(22) Filed: Apr. 25, 2022

(65) Prior Publication Data

US 2023/0345466 A1   Oct. 26, 2023

(51) Int. Cl.
 *H04W 72/1268* (2023.01)
 *H04L 5/14* (2006.01)
 *H04W 72/23* (2023.01)

(52) U.S. Cl.
 CPC ........... *H04W 72/1268* (2013.01); *H04L 5/14* (2013.01); *H04W 72/23* (2023.01)

(58) Field of Classification Search
 CPC ...... H04W 72/1268; H04W 72/23; H04L 5/14
 See application file for complete search history.

(56) References Cited

U.S. PATENT DOCUMENTS

| | | | |
|---|---|---|---|
| 10,805,942 B1* | 10/2020 | Li | H04W 72/0446 |
| 2020/0229103 A1* | 7/2020 | Hosseini | H04W 52/34 |
| 2022/0046670 A1* | 2/2022 | Lin | H04L 5/0053 |
| 2022/0271909 A1* | 8/2022 | Abotabl | H04L 5/14 |
| 2023/0379111 A1* | 11/2023 | Abdelghaffar | H04L 5/0051 |
| 2024/0073887 A1* | 2/2024 | Bae | H04W 72/21 |
| 2024/0267902 A1* | 8/2024 | Harada | H04W 76/20 |
| 2024/0388390 A1* | 11/2024 | Harrison | H04L 5/0044 |

OTHER PUBLICATIONS

3GPP TS 38.300 V16.8.0, Technical Specification; 3rd Generation Partnership Project; Technical Specification Group Radio Access Network; NR; NR and NG-Ran Overall Description; Stage 2 (Release 16) (Dec. 2021).

(Continued)

*Primary Examiner* — Jasper Kwoh
(74) *Attorney, Agent, or Firm* — NIXON & VANDERHYE P.C.

(57) ABSTRACT

A wireless terminal comprises receiver circuitry and processor circuitry. The receiver circuitry is configured to receive, over a radio interface, a serving cell frequency resource including a first subset of frequency resources. The processor circuitry is configured to determine, from the serving cell frequency resource, scheduling information for a physical channel; and then to use the scheduling information to either (a) filter reception power outside of the first subset of frequency resources, or (b) filter reception power outside of the serving cell frequency resource.

3 Claims, 14 Drawing Sheets

(56) References Cited

OTHER PUBLICATIONS

3GPP TS 38.304 V16.7.0, Technical Specification; $3^{rd}$ Generation Partnership Project; Technical Specification Group Radio Access Network; NR; User Equipment (UE) procedures in Idle mode and RRC Inactive state (Release 16) (Dec. 2021).

3GPP TS 38.331 V16.2.0, Technical Specification; $3^{rd}$ Generation Partnership Project; Technical Specification Group Radio Access Network; NR; Radio Resource Control (RRC) protocol specification (Release 16) (Sep. 2020).

RP-213591, 3GPP TSG RAN#94-e, CMCC (Moderator), "New SI: Study on evolution of NR duplex operation", Electronic Meeting, Dec. 6-17, 2021.

R1-1900603, 3GPP TSG RAN#94-e, Nokia, Nokia Shanghai Bell, "On wideband operation in NR-U", Chongqing, China, Oct. 14-20, 2019.

3GPP TS 38.211 V16.8.0, Technical Specification; $3^{rd}$ Generation Partnership Project; Technical Specification Group Radio Access Network; NR; Physical channels and modulations (Release 16) (Dec. 2021).

3GPP TS 38.212, v16.8.0, Technical Specification; $3^{rd}$ Generation Partnership Project; Technical Specification Group Radio Access Network; NR; Multiplexing and channel coding (Release 16) (Dec. 2021).

3GPP TS 38.213, v16.8.0, Technical Specification; $3^{rd}$ Generation Partnership Project; Technical Specification Group Radio Access Network; NR; Physical layer procedures for control (Release 16) (Dec. 2021).

3GPP TS 38.214, v16.8.0, Technical Specification; $3^{rd}$ Generation Partnership Project; Technical Specification Group Radio Access Network; NR; Physical layer procedures for data (Release 16) (Dec. 2021).

3GPP TS 38.321, v16.7.0, Technical Specification; $3^{rd}$ Generation Partnership Project; Technical Specification Group Radio Access Network; NR; Medium Access Control (MAC) protocol specification (Release 16) (Dec. 2021).

3GPP TS 38.331, v16.7.0, Technical Specification; $3^{rd}$ Generation Partnership Project; Technical Specification Group Radio Access Network; NR; Radio Resource Control (RRC); Protocol specification (Release 16) (Dec. 2021).

3GPP TS 38.101-1, v16.11.0, Technical Specification; $3^{rd}$ Generation Partnership Project; Technical Specification Group Radio Access Network; NR; User Equipment (UE) radio transmission and reception (Release 16) (Mar. 2022).

\* cited by examiner

USER EQUIPMENTS AND METHODS FOR DETERMINING TIME-FREQUENCY RESOURCE SET FOR ENHANCED DUPLEX OPERATION

TECHNICAL FIELD

The technology relates to wireless communications, and particularly to wireless terminals and operations thereof including operations to avoid, reduce or mitigate interference, e.g., cross link interference.

BACKGROUND

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in Fig. N, and is also described in 3GPP TS 38.300. The 5G NR network is comprised of NG RAN, Next Generation Radio Access Network, and 5GC, 5G Core Network. As shown, NGRAN is comprised of gNBs, e.g., 5G Base stations, and ng-eNBs, i.e., LTE base stations. An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations, i.e., gNB & ng-eNB. A gNB node provides NR user plane and control plane protocol terminations towards the UE and is connected via the NG interface to the 5GC. The 5G NR, New Radio, gNB is connected to Access and Mobility Management Function, AMF, and User Plane Function, UPF, in the 5G Core Network, 5GC.

Wireless transmissions from a base station in a direction toward a wireless terminal is referred to as being on the "downlink", DL, transmissions from the wireless terminal in a direction toward the base station is referred to as being on the "uplink", UL. As described in more detail herein, the transmissions may occur in a frame or sub-frame structure which may be conceptualized as a two-dimensional grid. The grid may be structured to have time slots in a first dimension and frequencies or sub-carriers in a second dimension. Time division duplex, TDD, operation occurs when information of the frame or sub-frame is split on a time basis between uplink and downlink. In TDD operation there may be a mapping or assignment, referred to as a TDD pattern, of time slots to uplink and downlink transmissions. Frequency division duplex, FDD, operation occurs when information of the frame or sub-frame is split on a frequency or sub-carrier basis between uplink and downlink.

Uplink coverage is a significant factor for a radio access network. In time division duplex, TDD, operation, uplink coverage is limited by the TDD pattern since the TDD pattern determines the maximum allowable transmission power for the wireless terminal. For example, when the TDD pattern is DL heavy, e.g., when a significant number of time slots are utilized for downlink transmission, the UE has less maximum allowable transmission power. As a result, uplink coverage is limited. Conversely, if the network is deployed with a UL heavy TDD pattern, e.g., when a significant number of time slots are utilized for uplink transmission, the network cannot serve enough DL traffic. Therefore, 3GPP takes into consideration operation with simultaneous transmission/reception for base station nodes within frequency resource(s).

What is needed are methods, apparatus, and/or techniques to deal with challenges of duplex wireless transmissions, including methods, apparatus, and/or techniques to avoid, reduce, or mitigate interference, e.g., cross link interference.

SUMMARY

In one of the example aspects of the technology described, a wireless terminal may selectively perform a first operation of filtering out reception power outside the first subset of frequency resource within the serving cell frequency resource and a second operation of filtering out reception power outside of the serving cell frequency resource, e.g., based on scheduling information. The scheduling information may be of a type that specifies, determines, or reflects PDSCH bandwidth.

In one of its example aspects the technology disclosed herein concerns a wireless terminal of a cellular telecommunication system. In a basic example embodiment and mode the wireless terminal comprises receiver circuitry and processor circuitry. The receiver circuitry is configured to receive, over a radio interface, a serving cell frequency resource including a first subset of frequency resources. The processor circuitry is configured to determine, from the serving cell frequency resource, scheduling information for a physical channel; and then to use the scheduling information to either (a) filter reception power outside of the first subset of frequency resources, or (b) filter reception power outside of the serving cell frequency resource. Methods of operating such wireless terminals are also provided.

In one of its example aspects the technology disclosed herein concerns a wireless terminal of a cellular telecommunication system. In a basic example embodiment and mode the wireless terminal comprises a physical unit; a higher layer unit; and a controller. The physical unit may in turn comprise an antenna unit, a radio frequency unit, an RF unit, and a baseband unit. The control circuitry is configured to (a) manage a first subset within frequency resources of a serving cell and a second subset within the frequency resources of the serving cell, and (b) to associate the first subset and a first TDD pattern, and to associate the frequency resources and the second TDD pattern. The baseband circuitry is configured to generate a physical channel in the frequency resources. The RF circuitry is configured to apply either the first subset or the frequency resources for bandwidth. The control circuitry is configured to determine which of the first subset and the frequency resources is applied to the bandwidth, based on information indicated by a DCI format which schedules the physical channel. Methods of operating such wireless terminals are also provided.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
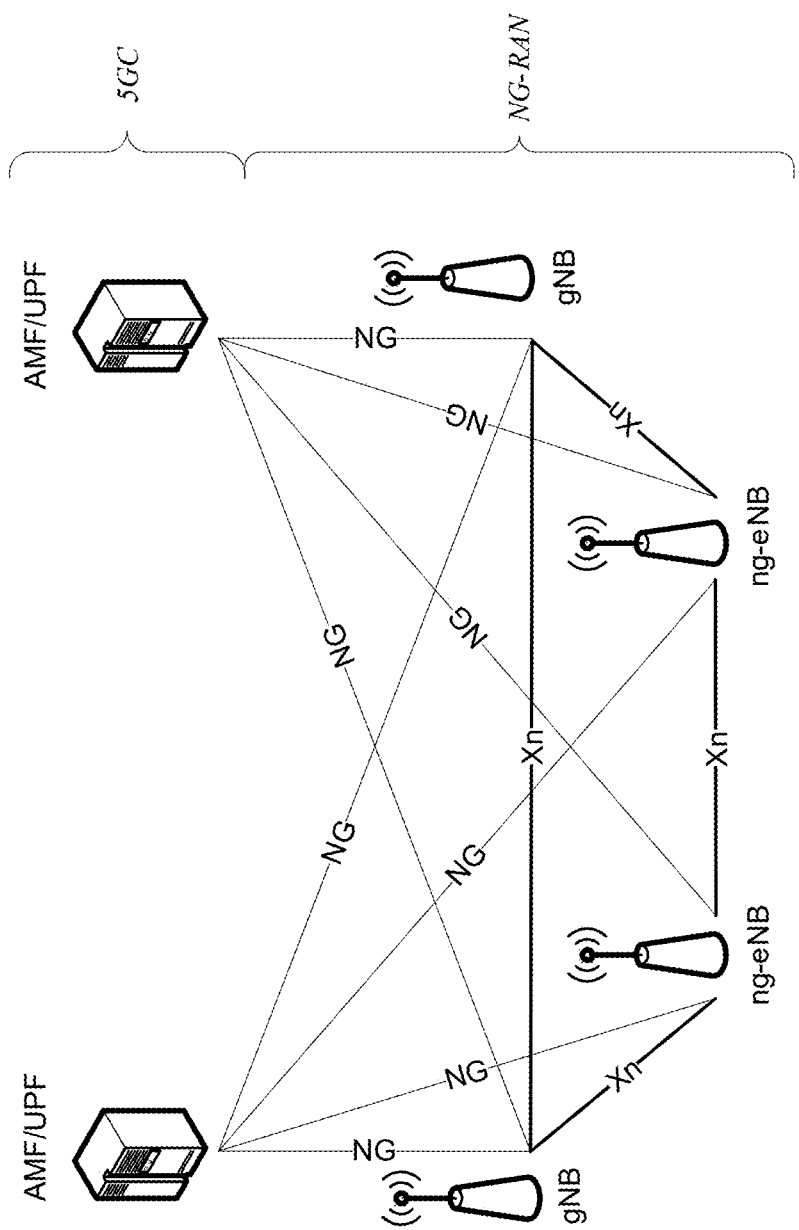
FIG. 1 is a diagrammatic view of overall architecture for a 5G New Radio system.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced, "IMTAdvanced". All or a subset of the cell may be adopted by 3GPP as licensed bands, e.g., frequency band, to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof, e.g., NUTRAN.

A core network, CN, such as core network (CN) 22 may comprise numerous servers, routers, and other equipment. As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc. For example, core network (CN) 22 may comprise one or more management entities, which may be an Access and Mobility Management Function, AMF.

As used herein, for a UE in IDLE Mode, a "serving cell" is a cell on which the wireless terminal in idle mode is camped. See, e.g., 3GPP TS 38.304. For a UE in RRC CONNECTED not configured with carrier aggregation, CA/dual connectivity, DC, there is only one serving cell comprising the primary cell. For a UE in RRC CONNECTED configured with CA/DC the term 'serving cells' is used to denote the set of cells comprising of the Special Cell(s) and all secondary cells. See, e.g., 3GPP TS 38.331.

Figure 2:
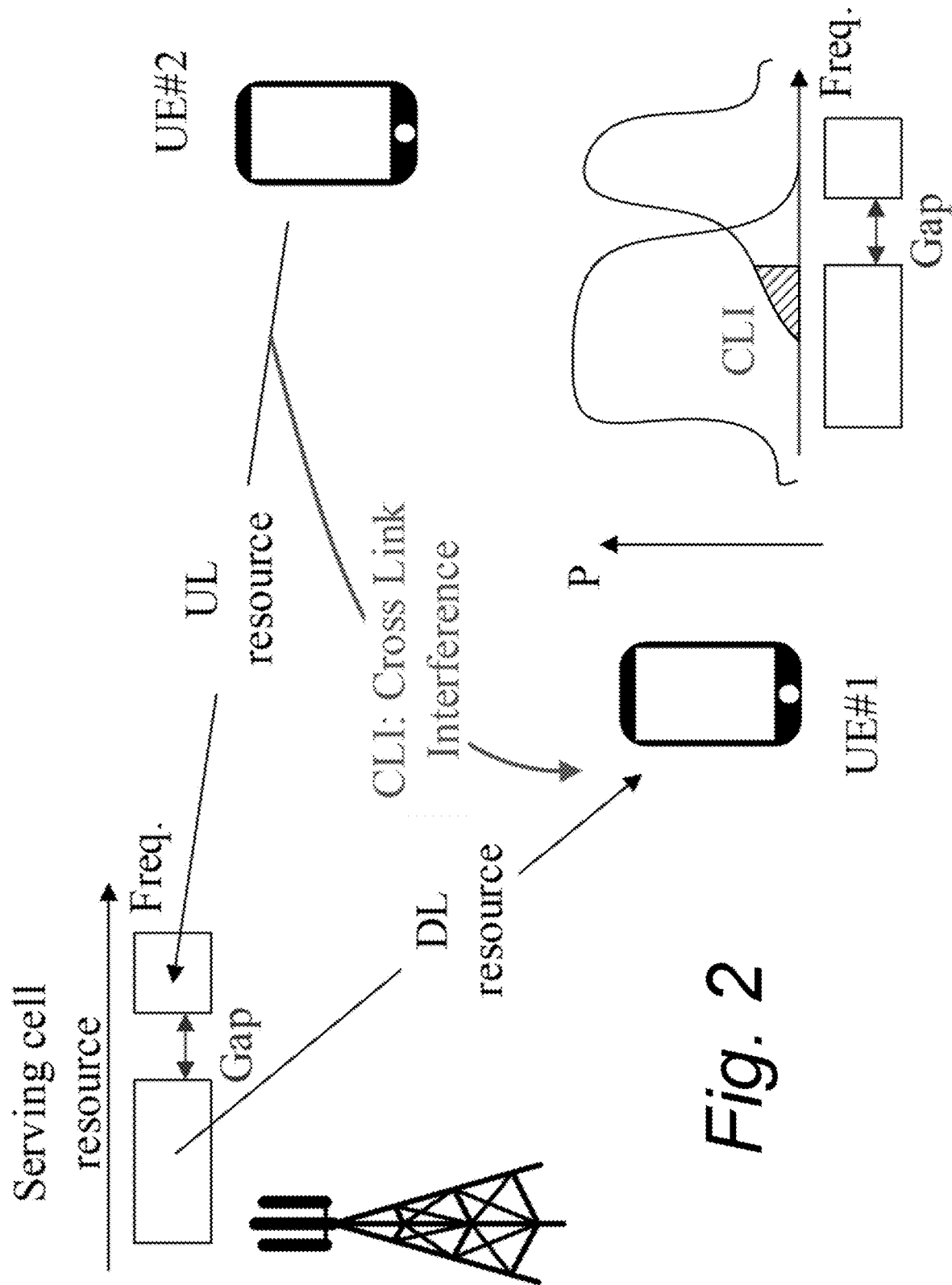
FIG. 2 is a diagrammatic view of portions of a communication system in a situation in which a base station is operating with simultaneous transmission/reception within a frequency resource for a single serving cell.

FIG. 2 shows a situation in which a base station is operating with simultaneous transmission/reception within frequency resource for a single serving cell. In the situation shown in FIG. 2, one wireless terminal, e.g., UE #1, may receive strong interference coming from transmission by another wireless terminal, UE #2. Such interference may be called by various terms, including Cross Link Interference, CLI. In FIG. 2, the uplink UL frequency resource is different from but adjacent to the downlink DL frequency resource. Therefore, channel leakage caused by UE #2's transmission via the UL resource may cause strong CLI for UE #1. This channel leakage is caused by UE #2's filtering operation where the UE #2 normally filters out reception power, including channel leakage, only outside of serving cell resource. As used herein, "serving cell resource" and "serving cell frequency resource" may be used interchangeably, and either may mean or comprise a resource grid, frame or sub-frame, or "carrier", e.g., in accordance with the above description.

As an example of possible cross link interference mitigation operation for the situation of FIG. 2, the UE #1 may filter out reception power outside a subset of DL frequency resource which may or may not be different from actual PDSCH frequency resource. There are two possible ways or modes for filtering out reception power. A first mode comprises UE #1 filtering out reception power outside a channel known as the physical downlink shared channel, PDSCH. A second mode comprises UE #1 filtering out reception power outside the subset of DL frequency resource.

Figure 3:
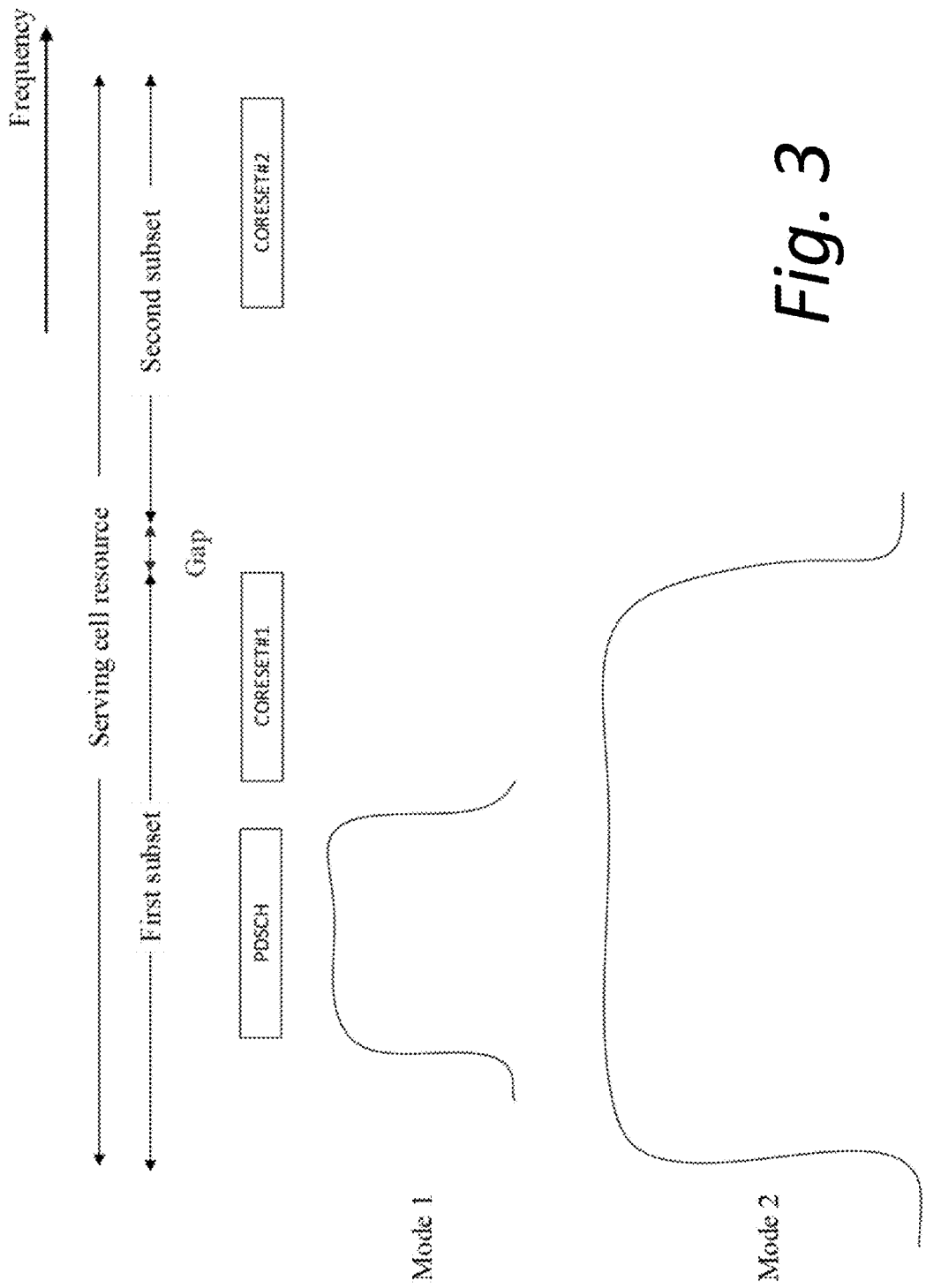
FIG. 3 is a diagrammatic view showing examples of cross-link interference, CLI, mitigation methods for a wireless terminal for receiving a physical channel such as PDSCH, for example.

FIG. 3 shows examples of cross-link interference, CLI, mitigation method for UE #1 in PDSCH reception. In FIG. 3, a physical downlink shared channel, PDSCH, scheduled for UE #1 within a first subset of a serving cell frequency resource. Further, UE #1 is configured with two control resource sets, CORESETs, in which UE #1 is required to monitor a PDCCH. Location information and/or bandwidth information of the first subset of a serving cell frequency resource may be provided by signaling in RRC layer. Signaling in RRC layer is also referred to as RRC signaling.

In mode 1 shown in FIG. 3, UE #1 filters out reception power outside the PDSCH. As a result, the UE #1 cannot monitor PDCCH either in CORESET #1 or in CORESET #2. In the FIG. 3 mode 1, it is reasonable to assume that the base station schedules uplink transmission from UE #2 to the base station in a second subset of the serving cell frequency resource. Therefore, the UE #1 is not required to monitor for PDCCH in CORESET #2. However, since the first subset should be still fully utilized for DL transmissions, UE #1 should monitor CORSET #1 for a PDCCH in the first subset and thus UE #1 should not filter out reception power of frequency resource for the CORESET #1. Location information and/or bandwidth information of the second subset may be provided by RRC signaling.

In mode 2 of FIG. 3, UE #1 filters out reception power only outside the first subset of the serving cell frequency resource. In the case of the second mode of FIG. 3, UE #1 can monitor the CORESET #1. Similar issues may happen when a CORESET, e.g., CORESET #1, is replaced by a periodic channel station information reference signal, CSI-RS. The UE #1 may need to monitor for CSI-RS periodically for such example purposes as, measuring channel quality, time/frequency tracking, and/or beam management. Thus, UE #1 should not filter out reception power of the frequency resource for the CORESET #1. On the other hand, if UE #1 always filters out reception power outside the first subset of the serving cell frequency resource, UE #1's DL capacity is reduced due to the bandwidth reduction from the serving cell frequency resource to the first subset of frequency resource. Other wireless terminals, such UE #2, may experience a same reduction in terms of uplink capacity.

The technology disclosed herein concerns a wireless terminal and method of operation thereof which provides features and advantages such as avoiding, reducing, or mitigating interference, e.g., cross link interference.

1.0 Architecture and Operation

Figure 4A:
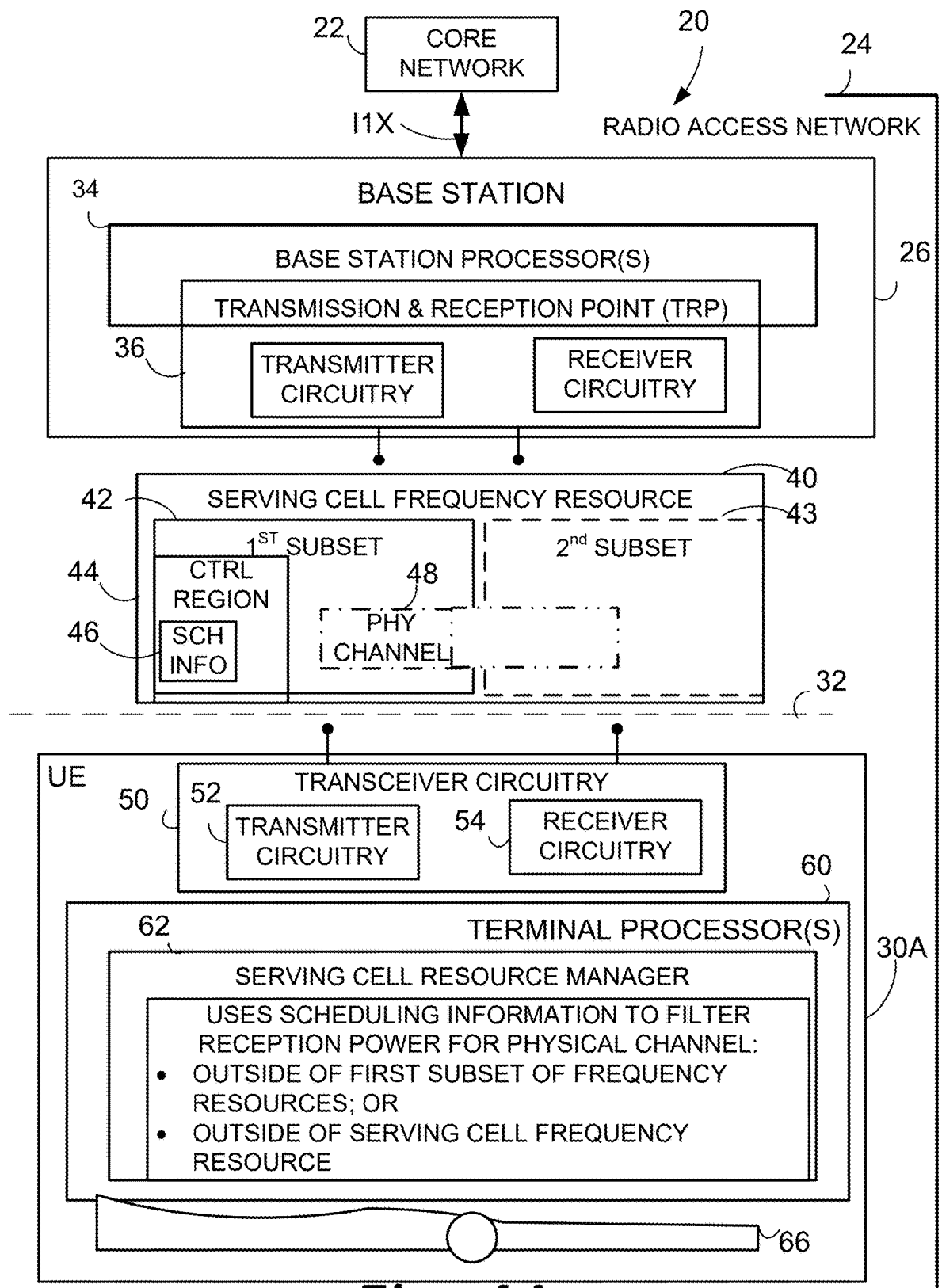
FIG. 4A is a schematic view of a communications system showing a core network, a radio access network, with the radio access network including a base station relay node and a wireless terminal that uses scheduling information to filter reception power for a physical channel according to an example embodiment and mode.

FIG. 4A shows a system diagram of an example communications network 20 which comprises a wireless terminal which uses scheduling information to filter reception power for a physical channel. The network 20, which may be a 5G network, for example, comprises core network 22 connected to at least one radio access network 24. The radio access network 24 in turn comprises one or more radio access network (RAN) nodes, such as example base station node 26 which is shown as being connected to the core network 22 by wireline(s) 28. The base station node 26 serves at least one cell.

The radio access network, RAN, 24 typically comprises plural access nodes, one example access nodes 26 being illustrated as a base station node in FIG. 4A. As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), a relay node, a mobile relay node, or some other similar terminology.

FIG. 4A shows the radio access network 24, and base station node 26 through its cell in particular communicating with wireless terminal 30A across a radio or air interface 32. The base station node 26 may, and usually does, communicate with plural wireless terminals across the air interface 32. Only one wireless terminal 30A is shown for sake of simplicity, it being understood that other wireless terminals may be provided and may operate in similar manner as the wireless terminal 30A herein illustrated.

FIG. 4A shows base station node 26 as comprising base station processor circuitry which may comprise one or more base station processors 34, as well as base station transceiver circuitry 36. As illustrated in FIG. 4A, the base station transceiver circuitry 36 may be a transmission and reception point (TRP). The base station node 26 may be structured essentially as shown in FIG. 4A or may be a node having architecture such as split architecture comprising a central unit and one or more distributed units that comprise mobile termination (MT). The base station processor(s) may include one or more TRPs.

Communication between radio access network (RAN) 22 and wireless terminal over the radio interface 32 may occur on various layers. Layer 1 includes radio layer 1 or the physical layer. Higher layers, e.g., layers higher than Layer 1 may include radio layer 2 and radio resource control layer 3. The layer 1 communication may occur by utilization of "resources". Reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource may occur in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10-millisecond frame consists of ten one millisecond subframes. An LTE subframe is divided into two slots (so that there are thus 20 slots in a frame). The transmitted signal in each slot is described by a resource grid comprised of resource elements (RE). Each column of the two-dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element, RE, is the smallest time-frequency unit for downlink transmission in the subframe. That is, one symbol on one sub-carrier in the sub-frame comprises a resource element (RE) which is uniquely defined by an index pair (k, l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix In 5G New Radio ("NR"), a frame consists of 10 millisecond, milli-second, duration. A frame consists of 10 subframes with each having 1 ms duration like LTE. Each subframe consists of $2^\mu$ slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. A mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

FIG. 4A also shows an example simplified structure of a serving cell frequency resource 40. As used herein, "serving cell frequency resource" refers to a plurality of radio resources which may radio resources comprising layer 1 communications between base station node 26 and 30A. As such, "serving cell frequency resource" encompasses and includes a frame, having examples described above, or a resource grid, or plural carriers, for example. FIG. 4A, in similar manner as previously described FIG. 2 and FIG. 3, shows serving cell frequency resource 40 as including a first subset of resources, referred to as first subset 42. Optionally the serving cell frequency resource 40 may include a second subset 43 of radio frequency resources, such optional nature being depicted by dashed lines in FIG. 4A. The serving cell frequency resource 40 typically includes a control region 44. In New Radio, the control region can be placed in any region in time/frequency domain, whereas in some earlier LTE versions the control region should be preferably located in the beginning of a subframe. The control region 44 may include scheduling information 46. An example of scheduling information 46 is a PDCCH with a DCI format. The scheduling information 46 may describe or reference other portions of the serving cell frequency resource 40. The other portion of serving cell frequency resource 40 that may be described or referenced by the scheduling information 46 may be one or more physical channels. An example of scheduling information 46 is a PDCCH with a DCI format. An example physical channel 48, which may be a physical downlink shared channel, PDSCH, is shown in FIG. 4A. For any given frame or serving cell frequency resource 40 the location and/or bandwidth of physical channel 48 may be variable or fluid. That is, depending upon the scheduling information 46, the location and/or bandwidth of physical channel 48 may either be entirely within the first subset 42 of the serving cell frequency resource 40, as shown by dashed dotted lines in FIG. 4A, or may be located at least partially outside of first subset 42, e.g., may at least partially extend beyond the first subset 42, as shown by dashed-double dotted lines in FIG. 4A.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

FIG. 4A also shows various example constituent components and functionalities of wireless terminal 30A. For example, FIG. 4A shows wireless terminal 30A as comprising terminal transceiver circuitry 50. The transceiver circuitry 50 in turn may comprise terminal transmitter circuitry 52 and terminal receiver circuitry 54. The terminal transceiver circuitry 50 may include antenna(e) for the wireless transmission. Terminal transmitter circuitry 52 may include, e.g., amplifier(s), modulation circuitry and other conventional transmission equipment. Terminal receiver circuitry 54 may comprise, e.g., amplifiers, demodulation circuitry, and other conventional receiver equipment.

FIG. 4A further shows wireless terminal 30A also comprising wireless terminal processor circuitry, e.g., one or more wireless terminal processor(s) 60. The wireless terminal 30A, e.g., wireless terminal processor(s) 60, may comprise serving cell frequency resource manager 62. The serving cell frequency resource manager 62 may also be referred to or function as a frame/message generator/handler. The serving cell frequency resource manager 62 manages, e.g., the serving cell frequency resource 40 obtained from base station node 26. An example aspect or feature of the wireless terminal 30A of the technology disclosed herein is that the wireless terminal 30A, by its serving cell frequency resource manager 62, for example, uses the scheduling information 46 to filter reception power for a physical channel, e.g., physical channel 48. The wireless terminal 30A uses the scheduling information 46 to filter or cut off reception power either (1) outside of the first subset 42 of frequency resources, or (2) outside of the serving cell frequency resource 40, as herein described.

The wireless terminal 30A may also comprise user interfaces 66, including one or more user interfaces. Such user interfaces may serve for both user input and output operations, and may comprise (for example) a keyboard, a mouse, a screen such as a touch screen that can both display information to the user and receive information entered by the user. The user interface 66 may also include other types of devices, such as a speaker, a microphone, or a haptic feedback device, for example.

Wireless terminal 30A thus comprises receiver circuitry, such as terminal receiver circuitry 54, and processor circuitry, such as wireless terminal processor(s) 60. The receiver circuitry is configured to receive, over radio interface 32, a serving cell frequency resource including a first subset of frequency resources. The processor circuitry is configured to determine, from the serving cell frequency resource, scheduling information for a physical channel; and then to use the scheduling information to either (a) filter reception power outside of the first subset of frequency resources, or (b) filter reception power outside of the serving cell frequency resource.

Figure 5A:
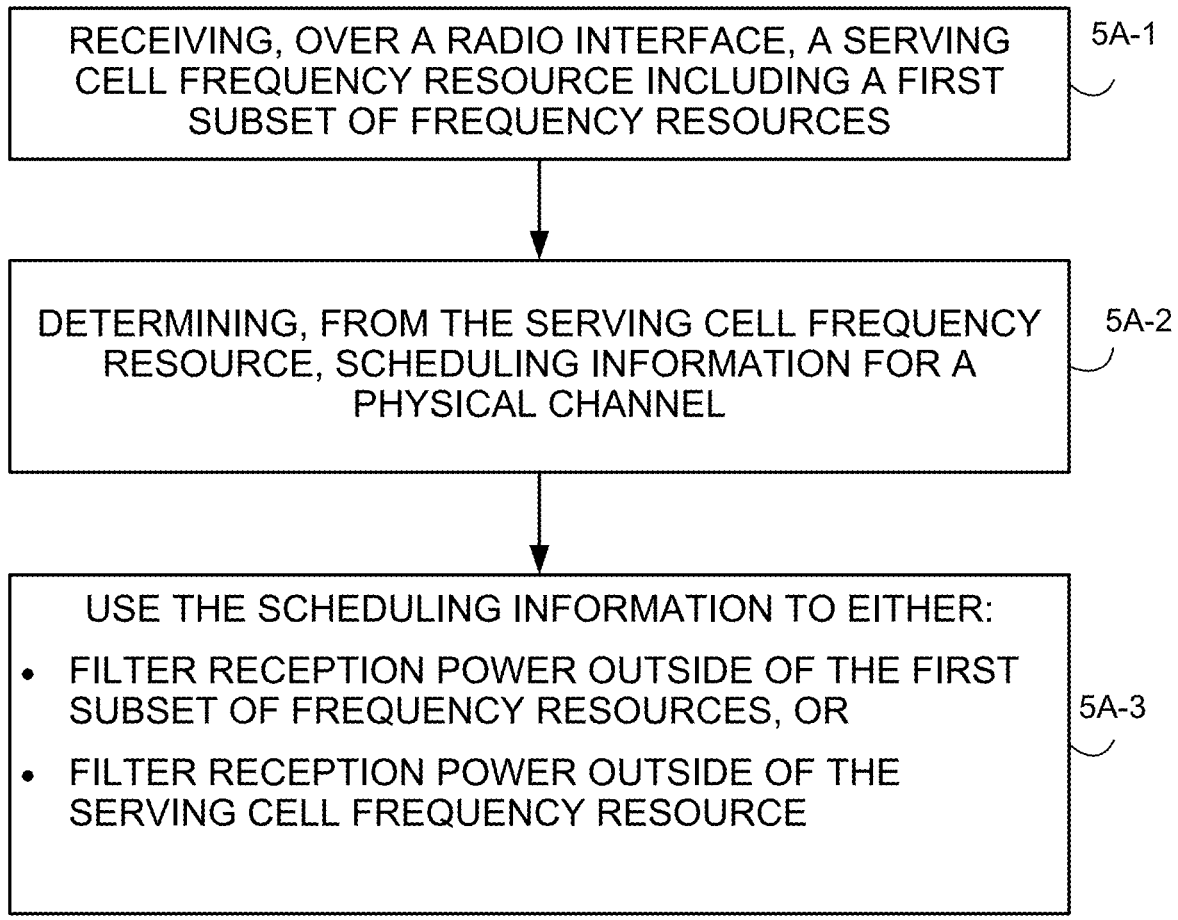
FIG. 5A is a flowchart view showing representative, example steps or acts performed by a wireless terminal of the communications system of the example embodiment and mode of FIG. 4A.

FIG. 5A shows example, representative, generic acts or steps performed by the wireless terminal 30A according to the example embodiment and mode of FIG. 4A. Act 5A-1 comprises receiving, over a radio interface, a serving cell frequency resource including a first subset of frequency resources. Act 5A-2 comprises determining, from the serving cell frequency resource, scheduling information for a physical channel. Act 5A-3 comprises using the scheduling information to either (a) filter reception power outside of the first subset of frequency resources, or (b) filter reception power outside of the serving cell frequency resource.

Figure 4B:
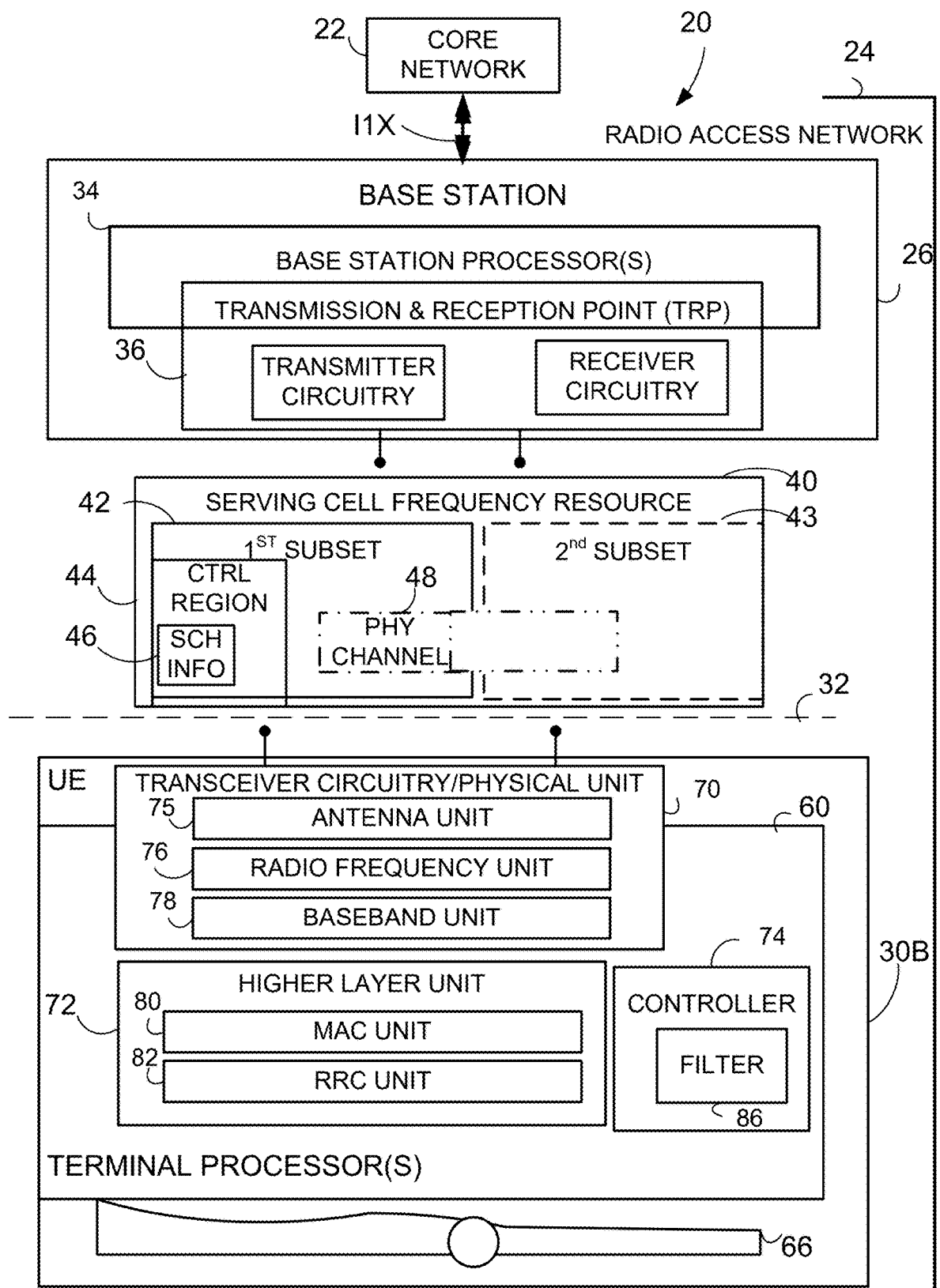
FIG. 4B is a schematic view of the communications system of FIG. 4A but with another conceptualization of structure and functionalities of the wireless terminal.

FIG. 4B resembles FIG. 4A, but shows another manner of conceptualizing the structures, circuitry, and functionality of a wireless terminal, illustrated as wireless terminal 30B in FIG. 4B. The components, units, structures, and functionalities of the wireless terminal 30B having same references numbers as those of wireless terminal 30A may be similar or even identical to those of FIG. 4A. Moreover, although terminology differing from FIG. 4A may be shown for the wireless terminal 30B of FIG. 4A, in some example embodiment and modes the elements reflected by such differing terminology may be encompassed within elements previously described with reference to FIG. 4A, e.g., within terminal transceiver circuitry 50 and/or wireless terminal processor(s) 60. By way of non-limiting example, FIG. 4B shows wireless terminal 30B as comprising physical unit 70; higher layer unit 72; and controller 74. The physical unit 70 may in turn comprise antenna unit 75, radio frequency unit, RF unit, 76, and baseband unit 78. The higher layer unit 72 in turn may comprise medium access control, MAC, unit 80 and radio resource control, RRC, unit 82. The controller 74 may comprise power filter 86.

Wireless terminal 30A thus comprises control circuits, such as controller 74, baseband circuitry, such as baseband unit 78, and RF circuitry, such as 76. The control circuitry is configured to (a) manage a first subset within frequency resources of a serving cell and a second subset within the frequency resources of the serving cell, and (b) to associate the first subset and a first TDD pattern, and to associate the frequency resources and the second TDD pattern. The baseband circuitry is configured to generate a physical channel in the frequency resources. For example, a time domain signal transmitted via wireless path for the PDSCH is generated by the baseband circuitry. The RF circuitry is configured to apply either the first subset or the frequency resources for maximum transmission bandwidth. The control circuitry is configured to determine which of the first subset and the frequency resources is applied to the bandwidth, based on information indicated by a DCI format which schedules the physical channel. Preferably the control circuitry is configured to determine which of the first subset and the frequency resources is applied to the maximum transmission bandwidth, based on information indicated by a DCI format which schedules the physical channel.

In the technology disclosed herein, the RF circuitry 76 may perform filtering operation for outside of the maximum transmission bandwidth. Therefore, as used herein, the control circuitry procedure of "apply [ing] a first subset of the frequency resources for maximum transmission bandwidth" may be equivalent to "filtering out reception power outside of the maximum transmission bandwidth".

Figure 5B:
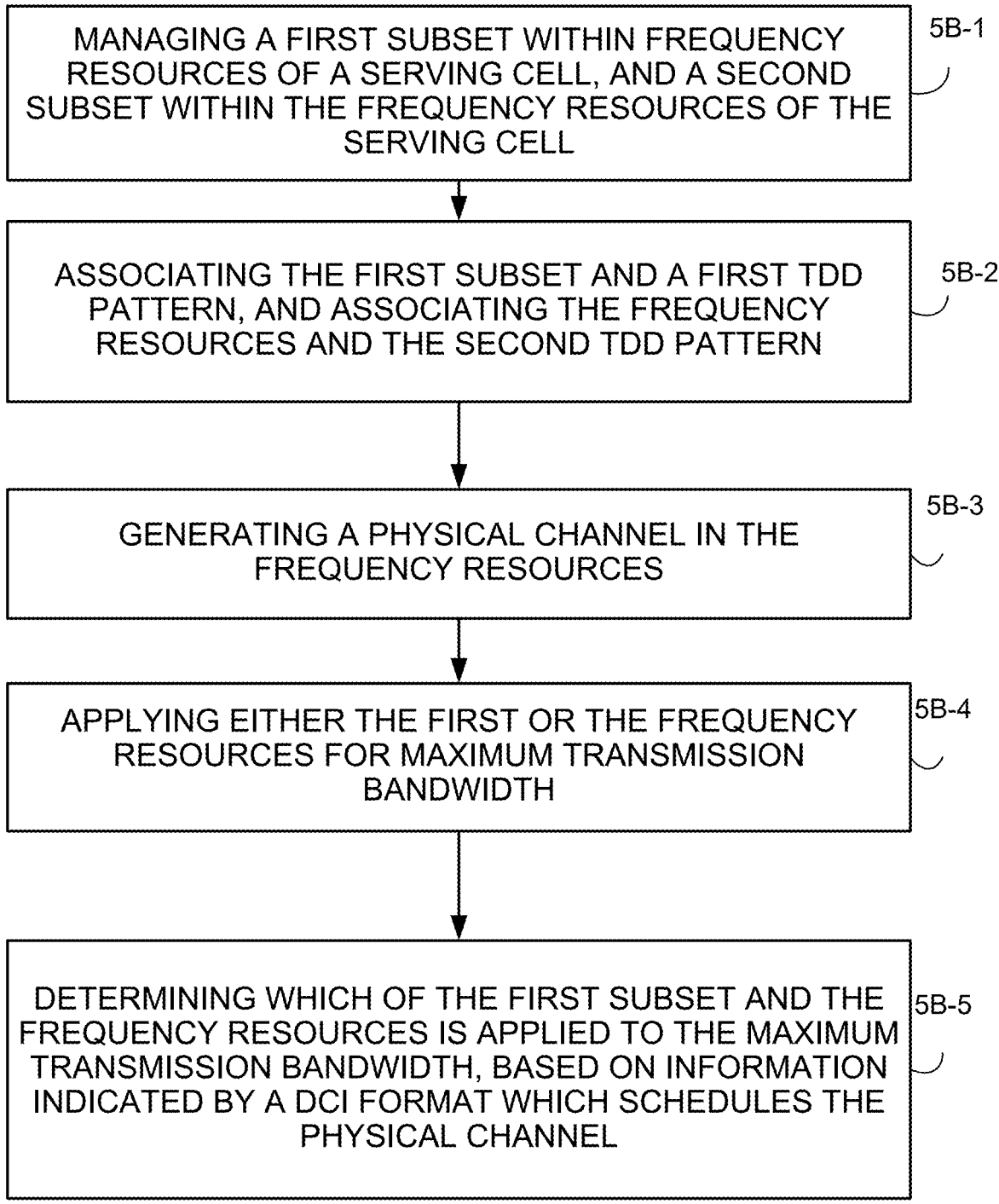
FIG. 5B is a flowchart view showing representative, example steps or acts performed by a wireless terminal of the communications system of the example embodiment and mode of FIG. 4B.

FIG. 5B shows example, representative, generic acts or steps performed by the wireless terminal 30B according to the example embodiment and mode of FIG. 4B. Act 5B-1 comprises managing a first subset within frequency resources of a serving cell and a second subset within the frequency resources of the serving cell. Act 5B-2 comprises associating the first subset and a first TDD pattern and associating the frequency resources and the second TDD pattern. Act 5B-3 comprises generating a physical channel in the frequency resources. Act 5B-4 comprises applying either the first or the frequency resources for maximum transmission bandwidth. Act 5B-5 comprises determining which of the first subset and the frequency resources is applied to the maximum transmission bandwidth, based on information indicated by a DCI format which schedules the physical channel.

Generic reference hereinafter to a wireless terminal or UE, e.g., UE #1, may refer to either or collectively to both wireless terminal 30A of FIG. 4A and wireless terminal 30B of FIG. 4B, and generic methods of operation thereof.

As described herein, a wireless terminal such as wireless terminal 30A or wireless terminal 30B may selectively perform a first operation of filtering out reception power outside the first subset of frequency resource within the serving cell resource and a second operation of filtering out reception power outside of the serving cell frequency resource, e.g., based on scheduling information. The scheduling information may be of a type that specifies, determines, or reflects PDSCH bandwidth.

Figure 6:
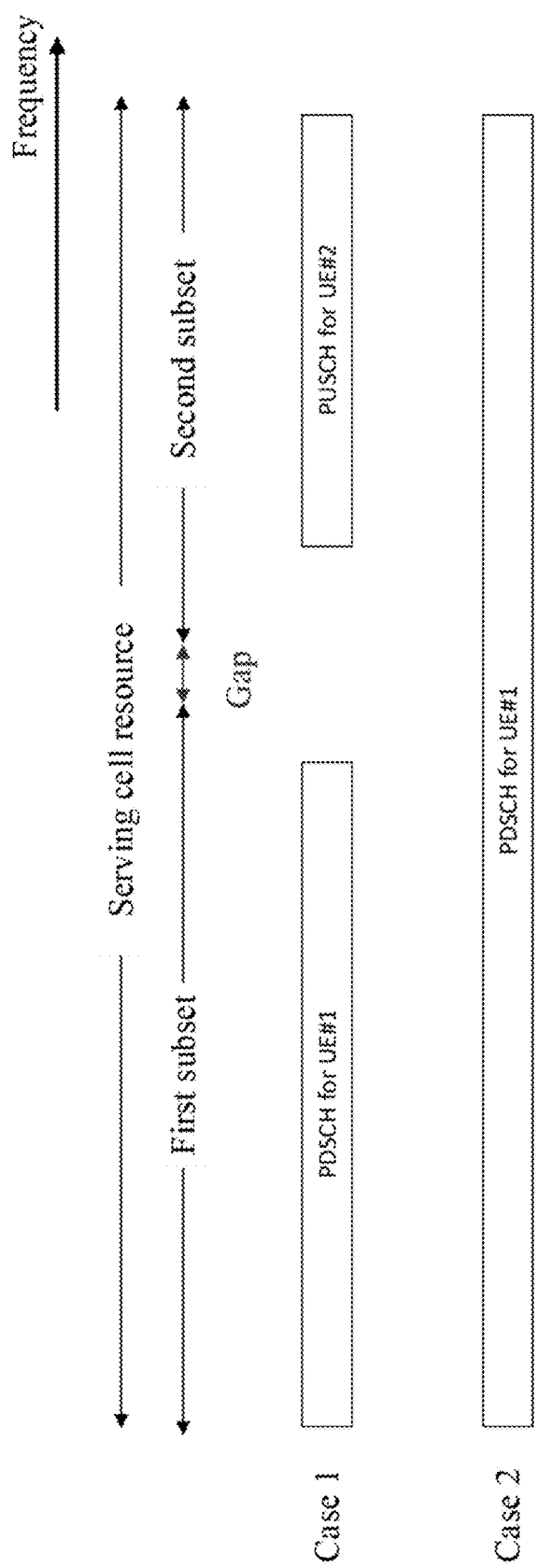
FIG. 6 is a diagrammatic view showing an example filtering operation that may be performed by one or more example embodiments and modes of a wireless terminal of the technology described herein.

FIG. 6 shows an example of filtering optimization that may be performed by a wireless terminal of the technology described herein. In FIG. 6 the horizontal axis represents frequency domain. FIG. 6 illustrates two cases of scheduling. In FIG. 6 case 1, the base station is operating with simultaneous transmission/reception within the serving cell. Therefore, UE #1 should filter out reception power outside the first subset of frequency resource. From the perspective of UE #1, the decision is made in an implicit way. That is, the UE #1 determines that the scheduled PDSCH is confined within the first subset of frequency resource. Then, the UE filters out outside the first subset of frequency resource. In FIG. 6 case 2, the base station is operating with DL transmission only within the serving cell. In FIG. 6 case 2, the base station may schedule wideband PDSCH without regard to the first subset. Accordingly, in FIG. 6 case 2 UE

1 determines that the scheduled PDSCH is not confined within the first subset of frequency resource. Therefore, UE #1 filters out reception power outside the serving cell frequency resource.

Figure 7:
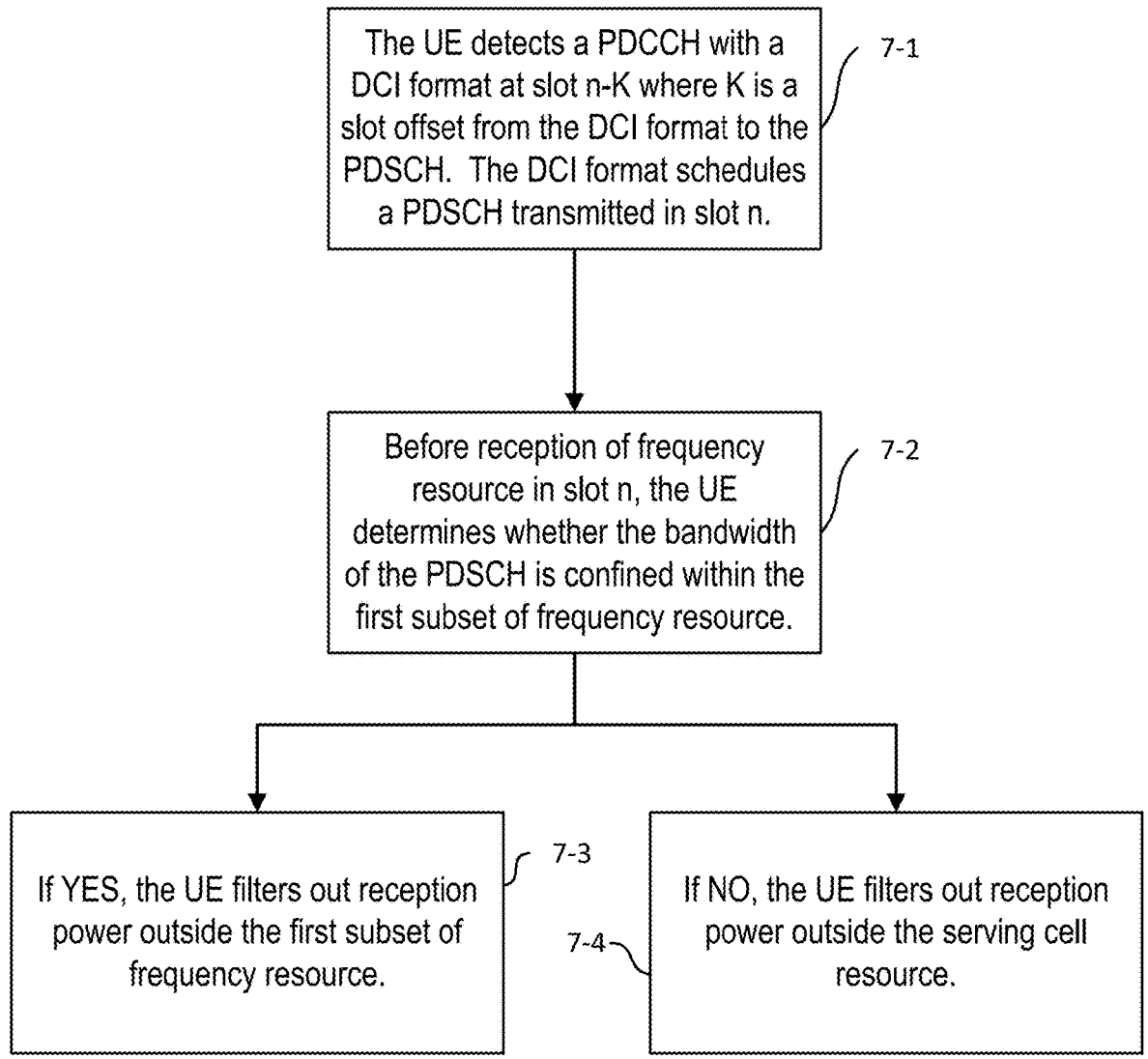
FIG. 7 is a flowchart showing example, representative, generic acts or steps which depict another way of expressing operation of a wireless terminal or UE of the technology described herein according to example embodiments and modes.

FIG. 7 is a flowchart showing example, representative, generic acts or steps which depict another way of expressing operation of a wireless terminal or UE of the technology described herein according to example embodiments and modes. Act 7-1 comprises the wireless terminal, UE, detecting scheduling information for an example PDSCH, the PDSCH being scheduled in an example slot, e.g., slot n. The scheduling information may be, for example, in a PDCCH with a DCI format. Before reception of the frequency resource in slot n, as act 7-2 the wireless terminal makes a decision of how the UE should perform a filtering operation with respect to slot n. In particular, the wireless terminal determines whether the bandwidth of the PDSCH is confined within the first subset 42 of the serving cell frequency resource 40. If the determination of act 7-2 is negative, as act 7-4 the wireless terminal filters out the reception power outside the serving cell frequency resource 40. If the determination of act 7-3 is positive, as act 7-3 the wireless terminal filters out the reception power outside the first subset 42 of the serving cell frequency resource 40.

Figure 8:
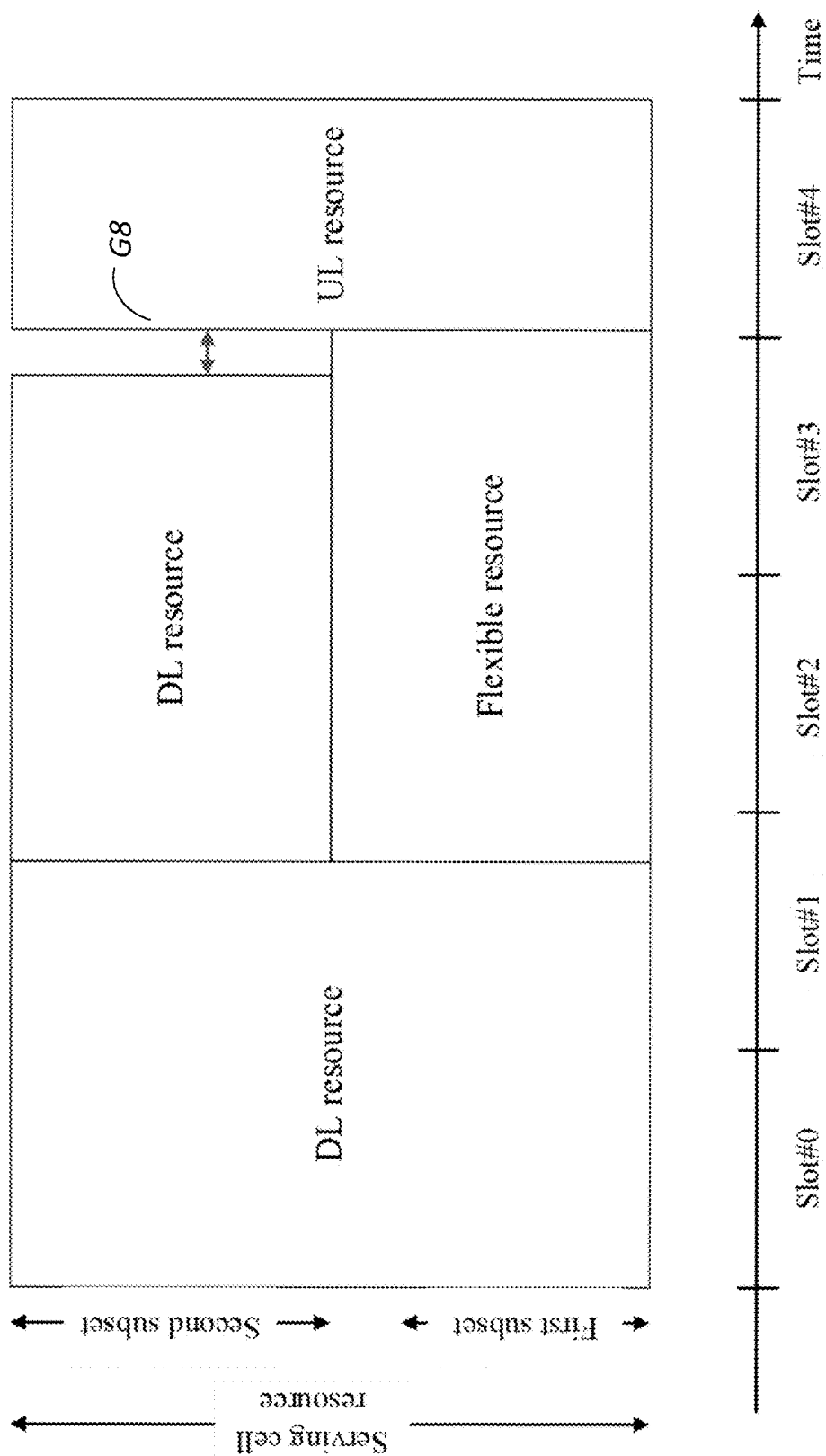
FIG. 8 is a diagrammatic view showing an example configuration of a basic time division duplex, TDD, pattern for enhanced duplex according to an example embodiment and mode.

FIG. 8 shows an example configuration of a basic time division duplex, TDD, pattern for enhanced duplex. In FIG. 8, a first subset of frequency resource and a second subset of frequency resource are configured differently within a serving cell frequency resource in a sense that the first subset 42 is configured with first TDD pattern, e.g., DDFFU) which is different from a second TDD pattern, e.g., DDDDU, with which the second subset is configured. As shown in FIG. 8, the first subset 42 is configured with first TDD pattern wherein the slots are sequentially shown as downlink, downlink, flexible, flexible, and uplink, e.g., DDFFU, whereas the second subset is configured with a second TDD pattern wherein the slots are sequentially shown as downlink, downlink, downlink, downlink, uplink, e.g., DDDDU. In FIG. 8, a gap G8 indicates a time domain gap for a DL/UL switching time. In FIG. 8 a "flexible resource" is a resource that can become either a downlink, DL, resource or an uplink, UL, resource depending on traffic demands. FIG. 8 is just one example of uplink coverage enhancement. If the base station wants to serve high speed uplink traffic as well as high speed downlink traffic, it is possible for the base station to change the DL resource(s) at/in slot #2 and #3 to UL resource(s). The TDD pattern uplink heavy by default, and the base station can utilize the flexible resource depending on traffic demands. Alternatively, or additionally, the base station may configure a narrow uplink resource that is always present in the flexible resource. In that case, the TDD pattern may maintain a narrow uplink subset of frequency resource to maintain PUCCH transmissions for coverage enhancement and/or faster HARQ-ACK feedback. Moreover, the base station can utilize the flexible resource depending on traffic demands.

Figure 9:
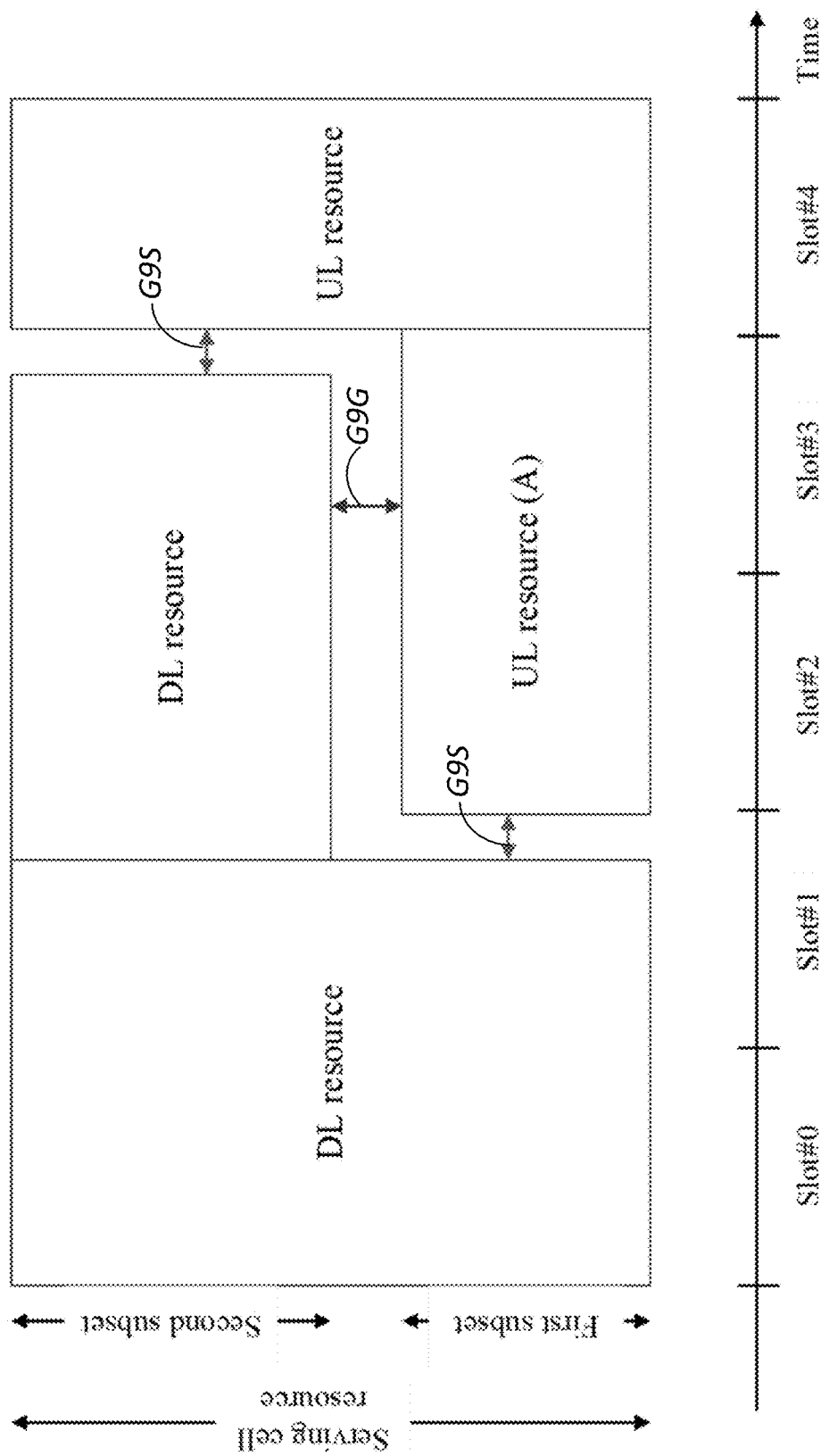
FIG. 9 is a diagrammatic view showing an example TDD pattern for serving uplink traffic which requires enhanced coverage.
Figure 10:
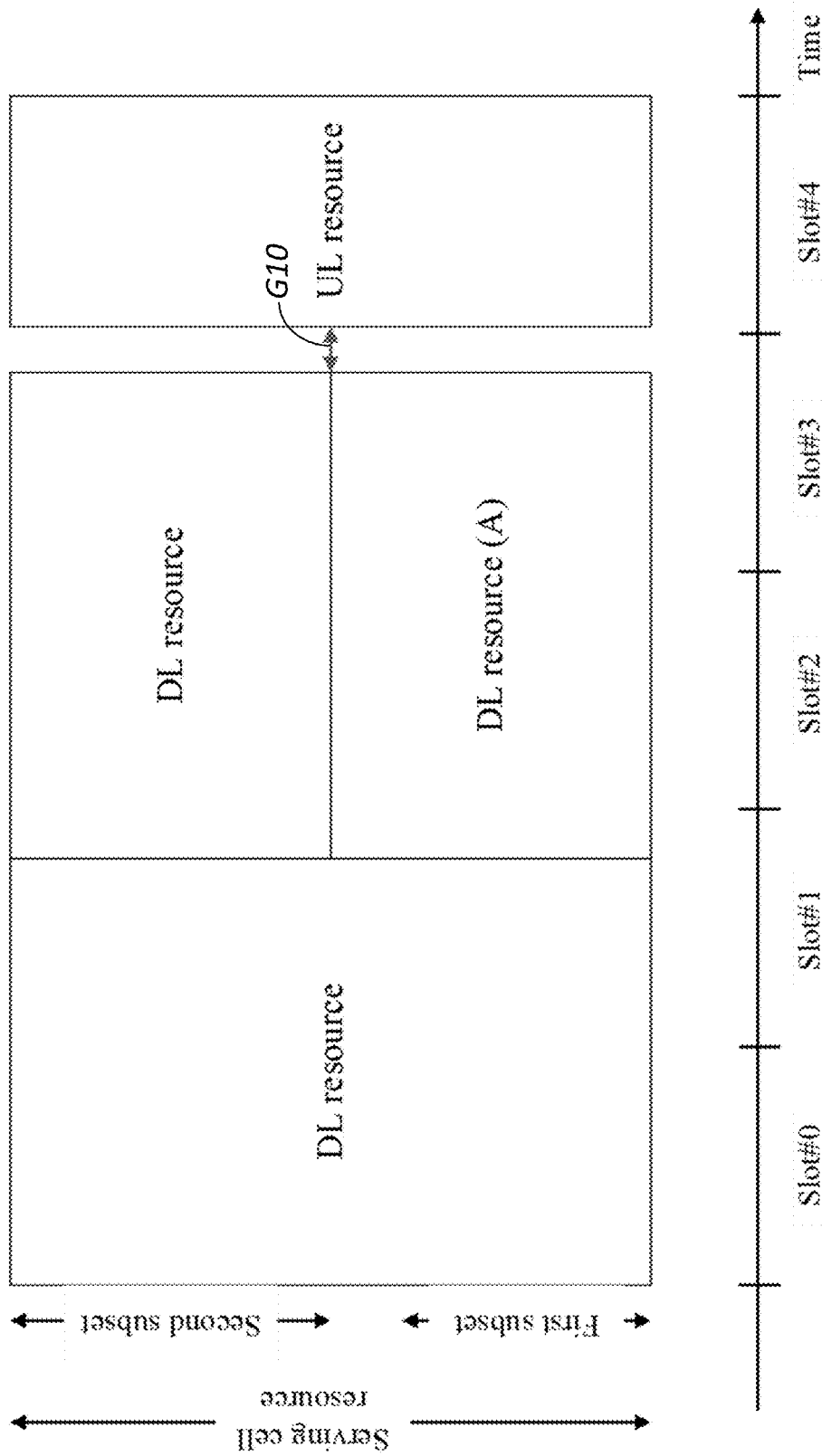
FIG. 10 is a diagrammatic view showing an example TDD pattern for serving high speed DL traffic.

Based on traffic demands, a base station can utilize the flexible resource for DL traffic or UL traffic as illustrated, by way of examples, in FIG. 9 and/or FIG. 10.

FIG. 9 is an example of a TDD pattern for serving UL traffic which requires enhanced coverage. In FIG. 9, gaps G9S indicate time domain gaps for DL/UL switching time and a gap G9G indicates a gap for a guard band for the wireless terminal(s) to filter out reception power. The UL resource (A) represents a UL resource changed from the flexible resource in FIG. 8.

FIG. 10 is an example of a TDD pattern for serving high speed DL traffic. In FIG. 10, a gap G10 indicates time domain gap for DL/UL switching time. The DL resource (A) represents a DL resource changed from the flexible resource in FIG. 8.

From the perspective of a wireless terminal, UE, the wireless terminal is required to know the actual TDD pattern so that the wireless terminal can determine whether periodic monitoring, such as configured monitoring or semi-static monitoring, is to be performed for each subset for downlink information such as CORESET or CSI-RS. The technology described herein provides two basic solution alternatives. According to a first solution, e.g., solution A, a Dynamic SFI indicates a change of the first TDD pattern. According to a second solution, e.g., solution B, the UE determines whether the first TDD pattern has been changed or not by information from scheduling information, such as downlink control information, DCI, for example.

A dynamic SFI is information indicated by a DCI format which is not used for scheduling either a PDSCH or a PUSCH. Therefore, a dynamic SFI is not scheduling information 46.

According to solution A, when the wireless terminal receives a dynamic slot format indication, SFI, the wireless terminal applies the TDD pattern indicated by the dynamic SFI for the first subset of frequency resource. Based on the TDD pattern for the first subset of frequency resource, the wireless terminal may determine the TDD pattern for the second subset. Therefore, the wireless terminal can determine whether to perform periodic monitoring within DL resource at slot #2 and slot #3 in the second subset of frequency resource. For example, the wireless terminal may determine that the DL resource in the second subset at slot #2 and slot #3 as a "prohibited resource" in which the UE does not perform periodic monitoring. Such procedure may be beneficial because the wireless terminal, which does not have simultaneous transmission/reception, cannot simultaneously transmit physical channels in the UL resource (A) and perform periodic monitoring in the second subset at slot #2 and slot #3. When the wireless terminal does not receive a dynamic SFI, the wireless terminal does not consider a change of TDD pattern for the first subset and the UE performs periodic monitoring within DL resource at slot #2 and #3 and the wireless terminal performs periodic monitoring within flexible resource. Thus, the flexible resource becomes an "unknown resource" at slot #2 and slot #3. In NR, when the wireless terminal fails to receive dynamic SFI, the wireless terminal interprets a flexible resource as an "unknown resource" in which periodic monitoring should be performed.

Solution B encompasses several sub-solutions, including solution B1 and solution B2 described herein. According to Solution B1, a wireless terminal determines whether the first TDD pattern has been changed or not by comparing bandwidth of scheduled PDSCH and bandwidth of the first subset of frequency resource. In Solution B1, the wireless terminal compares the bandwidth of the PDSCH and the bandwidth of the first subset. Then, if the bandwidth of the PDSCH is confined within the bandwidth of the first subset, the wireless terminal determines that the first TDD pattern has been changed. According to solution B2, the base station indicates whether the first TDD pattern has been changed or not by an indication in the scheduling information 46.

Figure 11:
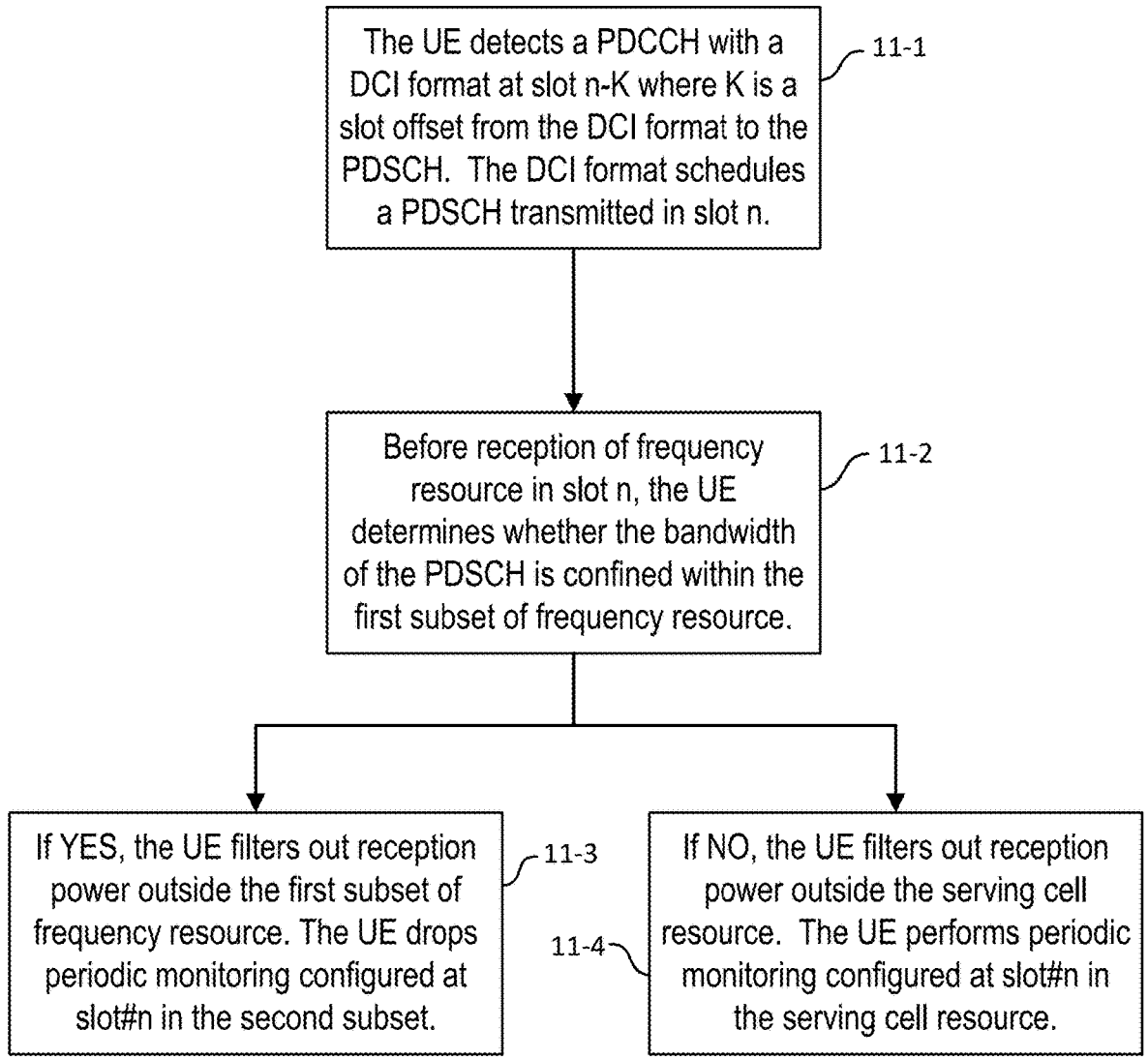
FIG. 11 is a flowchart showing example, representative, generic acts or steps which depict in more detail a way of expressing operation of a wireless terminal or UE of the technology described herein according to example embodiments and modes.

FIG. 11 shows an overall wireless terminal operation flow according to an example embodiment and mode, depicted by example, representative, generic acts or steps illustrated therein. Act 11-1 comprises the wireless terminal detecting a PDCCH with a DCI format at slot n-K of the serving cell frequency resource. The DCI format schedules a PDSCH transmitted at slot n of the serving cell frequency resource. Before reception of frequency resource in slot n, as act 11-2 the wireless terminal determines whether the first TDD pattern has been changed or not by Solution A or Solution B. If the first TDD pattern has changed, as act 11-3 the wireless terminal filters out reception power outside of the first subset 42 of serving cell frequency resource and/or drops or discontinues/does not monitor of slot #n. On the other hand, if it is determined as act 11-2 that the TDD pattern has not changed, as act 11-4 the wireless terminal filters out reception power outside of the serving cell frequency resource and/or does perform periodic monitoring of slot #n in the serving cell frequency resource.

The wireless terminal may determine which solution to be used by DCI format type. For example, the wireless terminal may apply a first solution among solution A, solution B1, and solution B2, when the PDSCH is scheduled by a DCI format 1_0. For example, the wireless terminal may apply a second solution which is different from the first solution, when the PDSCH is scheduled by a DCI format 1_1. For example, the first solution may be solution B1 and the second solution may be solution B2.

2.0 TDD Configuration Methods

Several configuration methods to achieve new TDD configuration(s) such as shown in FIG. 9, for example, are encompassed by the technology described herein, including the following as examples.

2.1 TDD Configuration 1

The second TDD pattern is provided by existing common TDD configuration, i.e., TDD-UL-DL-ConfigCommon, and the first TDD pattern is provided by existing dedicated TDD configuration, i.e., TDD-UL-DL-ConfigDedicated. The second TDD pattern is configured as DSFFU, S=12D2F, and the first TDD pattern is configured as DSUUU, S=10D2F2U. The second TDD pattern is associated with the serving cell resource and the first TDD pattern is associated with the first subset.

On the other hand, the legacy UE, or a UE not capable of enhanced duplex, will understand that those configurations as is, e.g., no association between subsets and TDD patterns, or equivalently the first TDD pattern is associated with the serving cell resource, and the second TDD pattern is associated with the serving cell resource. In that case, transmission/reception for the legacy UE should not be allocated for slot #2 and slot #3 when the base station is operating with simultaneous transmission/reception. It means, common signaling, e.g., SS/PBCH blocks, SIB1 PDSCH, Paging PDSCH, msg2, msg3, msg4, etc., should not be allocated for those slots. The 3GPP specification does not need to specify that, but the base station should ensure not allocating the common signaling for those slots.

The UE capable of enhanced duplex is required to determine in which resource of the serving cell resource or the first subset the UE is scheduled to transmit/receive at slot #2 or slot #3. Solution A or B can be applied for decision. Further, when the UE determined that the transmission/reception is associated with the first subset, the UE may determine a third TDD pattern which is applied to the second subset as DSPPU. Here, 'P' represents "prohibited resource". In another example, when the UE determined that the transmission/reception is associated with the serving cell resource, the UE may not determine a third TDD pattern. When the UE determined that the transmission/reception is associated with the serving cell resource, the UE may determine whether to perform periodic monitoring in the second subset or not may be determined by the second TDD pattern.

2.2 TDD Configuration 2

The second TDD pattern is provided by existing common TDD configuration in which resource of the serving cell resource or the first subset the UE is scheduled to transmit/receive at slot #2 or slot #3. Solution A or B can be applied for decision as DDDSU, S=10D2F2U, and the first TDD pattern is configured as DSUUU, S=10D2F2U. The second TDD pattern is associated with the serving cell resource and the first TDD pattern is associated with the first subset.

The legacy UE does not recognize the new dedicated TDD configuration. Thus, Configuration 2 is almost the same as Configuration 1 in terms of the legacy UE.

The UE capable of enhanced duplex is required to determine in which resource of the serving cell resource or the first subset the UE is scheduled to transmit/receive at slot #2 or slot #3. Solution A or B can be applied for decision.

2.3 TDD Configuration 3

The second TDD pattern is provided by existing TDD configuration, e.g., TDD-UL-DL-ConfigCommon, and the first TDD pattern is provided by existing dynamic SFI. The second TDD pattern is configured as DSFFU, S=12D2F. The first TDD pattern is indicated dynamically by dynamic SFI either DDDSU, S=10D2F2U, or DSUUU, S=10D2F2U. The second TDD pattern is associated with the serving cell resource and the first TDD pattern is associated with the first subset.

On the other hand, the legacy UE considers that the dynamic SFI is not associated with any resource or equivalently the legacy UE regards that the first TDD pattern provided by the dynamic SFI is associated with the serving cell resource. In that case, transmission/reception for the legacy UE should not be allocated for slot #2 and slot #3 when the base station is operating with simultaneous transmission/reception. It means, common signaling, e.g., SS/PBCH blocks, SIB1 PDSCH, Paging PDSCH, msg2, msg3, msg4, etc., should not be allocated for those slots. The 3GPP specification does not need to specify that, but the base station should ensure not allocating the common signaling for those slots.

The UE capable of enhanced duplex is required to determine in which resource of the serving cell resource or the first subset the UE is scheduled to transmit/receive at slot #2 or slot #3. Solution A or B can be applied for decision. Further, when the UE determined that the transmission/reception is associated with the first subset, the UE may determine a third TDD pattern which is applied to the second subset as DSPPU. Here, 'P' represents "prohibited resource". In another example, when the UE determined that the transmission/reception is associated with the serving cell resource, the UE may not determine a third TDD pattern. When the UE determined that the transmission/reception is associated with the serving cell resource, the UE may determine whether to perform periodic monitoring in the second subset or not may be determined by the second TDD pattern.

2.4 Configuration 4

The second TDD pattern is provided by existing TDD configuration and, e.g., TDD-UL-DL-ConfigCommon, and the first TDD pattern is provided by new dynamic SFI. The second TDD pattern is configured as DSUUU, S=10D2F2U. The first TDD pattern is indicated dynamically by dynamic SFI either DDDSU, S=10D2F2U, or DSUUU, S=10D2F2U.

The second TDD pattern is associated with the serving cell resource and the first TDD pattern is associated with the first subset.

The legacy UE does not recognize the new dynamic SFI. Thus, Configuration 4 is almost the same as Configuration 3 in terms of the legacy UE.

The UE capable of enhanced duplex is required to determine in which resource of the serving cell resource or the first subset the UE is scheduled to transmit/receive at slot #2 or slot #3. Solution A or B can be applied for decision.

The UE drops periodic monitoring in the second subset, based on the second TDD pattern.

2.5 Configuration 5

The second TDD pattern is provided by new TDD configuration, e.g., TDD-UL-DL-ConfigEnhancedDuplexSecondSubset, and the first TDD pattern is provided by new TDD configuration, e.g., TDD-UL-DL-ConfigEnhancedDuplexFirstSubset. The second TDD pattern is configured as DSUUU, S=10D2F2U. The first TDD pattern is configured as DDDSU, S=10D2F2U. With this configuration, the UE not capable of enhanced duplex cannot access to the serving cell. The UE capable of enhanced duplex can only access to the serving cell.

3.0 Further Considerations

It should be understood that the various foregoing example embodiments and modes may be utilized in conjunction with one or more example embodiments and modes described herein.

A PDCCH may be used to transmit downlink control information (DCI). A PDCCH may be transmitted to deliver downlink control information. The terminal device 1 may receive a PDCCH in which downlink control information is arranged. The base station device 3 may transmit the PDCCH in which the downlink control information is arranged.

DCI format is a generic name for DCI format 0_0, DCI format 0_1, DCI format 1_0, and DCI format 1_1. Uplink DCI format is a generic name of the DCI format 0_0 and the DCI format 0_1. Downlink DCI format is a generic name of the DCI format 1_0 and the DCI format 1_1.

The DCI format 0_0 is at least used for scheduling a PUSCH for a cell. The DCI format 0_0 includes at least a part or all of fields 1A to 1E. The 1A is a DCI format identification field (Identifier field for DCI formats). The 1B is a frequency domain resource assignment field (FDRA field). The 1C is a time domain resource assignment field (TDRA field). The 1D is a frequency-hopping flag field. The 1E is an MCS field (Modulation-and-Coding-Scheme field).

The DCI format identification field may indicate whether the DCI format including the DCI format identification field is an uplink DCI format or a downlink DCI format. The DCI format identification field included in the DCI format 0_0 may indicate 0 (or may indicate that the DCI format 0_0 is an uplink DCI format).

The frequency domain resource assignment field included in the DCI format 0_0 may be at least used to indicate the assignment of frequency resources for a PUSCH scheduled by the DCI format 0_0.

The time domain resource assignment field included in the DCI format 0_0 may be at least used to indicate assignment of time resources for a PUSCH scheduled by the DCI format 0_0.

The frequency-hopping flag field may be at least used to indicate whether frequency-hopping is applied to a PUSCH scheduled by the DCI format 0_0.

The MCS field included in the DCI format 0_0 may be at least used to indicate a modulation scheme for a PUSCH scheduled by the DCI format 0_0 and/or a target coding rate for the PUSCH. A size of a transport block (TBS: Transport Block Size) of a PUSCH may be determined based at least on a target coding rate and a modulation scheme for the PUSCH.

The DCI format 0_0 may not include fields used for requesting a CSI report. That is, CSI reporting may not be requested by the DCI format 0_0.

The DCI format 0_0 may not include a carrier indicator field. The terminal device 1 may determine that a serving cell on which a PUSCH scheduled by the DCI format 0_0 is arranged is the same as a serving cell on which a PDCCH including the DCI format 0_0 is arranged.

The DCI format 0_0 may not include a BWP field. The terminal device 1 may determine that the active uplink BWP change for the serving cell on which the PUSCH is arranged doesn't occur by the DCI format 0_0.

The DCI format 0_1 is at least used for scheduling of a PUSCH for a cell. The DCI format 0_1 includes at least a part or all of fields 2A to 2H. The 2A is a DCI format identification field. The 2B is a frequency domain resource assignment field. The 2C is a time domain resource assignment field. The 2D is a frequency-hopping flag field. The 2E is an MCS field. The 2F is a CSI request field. The 2G is a BWP field. The 2H is a carrier indicator field.

The DCI format identification field included in the DCI format 0_1 may indicate 0 (or may indicate that the DCI format 0_1 is an uplink DCI format).

The frequency domain resource assignment field included in the DCI format 0_1 may be at least used to indicate assignment of frequency resources for a PUSCH scheduled by the DCI format.

The time domain resource assignment field included in DCI format 0_1 may be at least used to indicate assignment of time resources for a PUSCH scheduled by the DCI format 0_1.

The frequency-hopping flag field may be at least used to indicate whether frequency-hopping is applied to a PUSCH scheduled by the DCI format 0_1.

The MCS field included in the DCI format 0_1 may be at least used to indicate a modulation scheme for a PUSCH scheduled by the DCI format and/or a target coding rate for the PUSCH.

When the DCI format 0_1 includes the BWP field, the BWP field may be used to indicate an uplink BWP on which a PUSCH scheduled by the DCI format 0_1 is arranged. When the DCI format 0_1 does not include the BWP field, the terminal device 1 may determine that the active uplink BWP change for the serving cell on which the PUSCH is arranged doesn't occur by the DCI format. When the DCI format 0_1 includes the BWP field but the terminal device 1 doesn't have a capability of switching active uplink BWP by indication from DCI formats, the terminal device 1 may determine that the active uplink BWP change for the serving cell on which the PUSCH is arranged doesn't occur by the DCI format.

The CSI request field is at least used to indicate whether CSI reporting is requested or not.

If the DCI format 0_1 includes the carrier indicator field, the carrier indicator field may be used to indicate a serving cell on which a PUSCH is arranged. When the DCI format 0_1 does not include the carrier indicator field, the terminal device 1 may determine that a serving cell on which a PUSCH is arranged may be the same as the serving cell on which a PDCCH including the DCI format 0_1 used for scheduling of the PUSCH is arranged.

The DCI format 1_0 is at least used for scheduling of a PDSCH for a cell. The DCI format 1_0 includes at least a part or all of fields 3A to 3E. The 3A is a DCI format identification field. The 3B is a frequency domain resource assignment field. The 3C is a time domain resource assignment field. The 3D is an MCS field. The 3E is a PDSCH-to-HARQ-feedback indicator field.

The DCI format identification field included in the DCI format 1_0 may indicate 1 (or may indicate that the DCI format 1_0 is a downlink DCI format).

The frequency domain resource assignment field included in the DCI format 1_0 may be at least used to indicate assignment of frequency resources for a PDSCH scheduled by the DCI format 1_0.

The time domain resource assignment field included in the DCI format 1_0 may be at least used to indicate assignment of time resources for a PDSCH scheduled by the DCI format 1_0.

The MCS field included in the DCI format 1_0 may be at least used to indicate a modulation scheme for a PDSCH scheduled by the DCI format 1_0 and/or a target coding rate for the PDSCH. A size of a transport block (TBS: Transport Block Size) of a PDSCH may be given based at least on a target coding rate and a modulation scheme for the PDSCH.

The PDSCH-to-HARQ-feedback timing indicator field may be at least used to indicate the offset (K1) from a slot in which the last OFDM symbol of a PDSCH scheduled by the DCI format 1_0 is included to another slot in which the first OFDM symbol of a PUCCH triggered by the DCI format 1_0 is included.

The DCI format 1_0 may not include the carrier indicator field. The terminal device 1 may determine that a downlink component carrier (or a serving cell) on which a PDSCH scheduled by the DCI format 1_0 is arranged is the same as a downlink component carrier (or a serving cell) on which a PDCCH including the DCI format 1_0 is arranged.

The DCI format 1_0 may not include the BWP field. A downlink BWP on which a PDSCH scheduled by a DCI format 1_0 is arranged may be the same as a downlink BWP on which a PDCCH including the DCI format 1_0 is arranged.

The DCI format 1_1 is at least used for scheduling of a PDSCH for a cell (or arranged on a cell). The DCI format 1_1 includes at least a part or all of fields 4A to 4G. The 4A is a DCI format identification field. The 4B is a frequency domain resource assignment field. The 4C is a time domain resource assignment field. The 4D is an MCS field. The 4E is a PDSCH-to-HARQ-feedback indicator field. The 4F is a BWP field. The 4G is a carrier indicator field.

The DCI format identification field included in the DCI format 1_1 may indicate 1 (or may indicate that the DCI format 1_1 is a downlink DCI format).

The frequency domain resource assignment field included in the DCI format 1_1 may be at least used to indicate assignment of frequency resources for a PDSCH scheduled by the DCI format 1_1.

The time domain resource assignment field included in the DCI format 1_1 may be at least used to indicate assignment of time resources for a PDSCH scheduled by the DCI format 1_1.

The MCS field included in the DCI format 1_1 may be at least used to indicate a modulation scheme for a PDSCH scheduled by the DCI format 1_1 and/or a target coding rate for the PDSCH.

When the DCI format 1_1 includes a PDSCH-to-HARQ-feedback timing indicator field, the PDSCH-to-HARQ-feedback timing indicator field indicates an offset (K1) from a slot including the last OFDM symbol of a PDSCH scheduled by the DCI format 1_1 to another slot including the first OFDM symbol of a PUCCH triggered by the DCI format 1_1. When the DCI format 1_1 does not include the PDSCH-to-HARQ-feedback timing indicator field, an offset from a slot in which the last OFDM symbol of a PDSCH scheduled by the DCI format 1_1 is included to another slot in which the first OFDM symbol of a PUCCH triggered by the DCI format 1_1 is identified by a higher-layer parameter.

When the DCI format 1_1 includes the BWP field, the BWP field may be used to indicate a downlink BWP on which a PDSCH scheduled by the DCI format 1_1 is arranged. When the DCI format 1_1 does not include the BWP field, the terminal device 1 may determine that a downlink BWP on which a PDSCH scheduled by the DCI format 1_1 is arranged is the same as a downlink BWP on which a PDCCH including the DCI format 1_1 is arranged. When the DCI format 1_1 includes the BWP field but the terminal device 1 doesn't have a capability of switching active downlink BWP by indication from DCI formats, the terminal device 1 may determine that an downlink BWP on which a PDSCH scheduled by the DCI format 1_1 is arranged is the same as an downlink BWP on which a PDCCH including the DCI format 1_1 is arranged.

If the DCI format 1_1 includes the carrier indicator field, the carrier indicator field may be used to indicate a downlink component carrier (or a serving cell) on which a PDSCH is arranged. When the DCI format 1_1 does not include the carrier indicator field, the terminal device 1 may determine that a downlink component carrier (or a serving cell) on which a PDSCH is arranged may be the same as a downlink component carrier (or a serving cell) on which a PDCCH including the DCI format 1_1 used for scheduling of the PDSCH is arranged.

A PDSCH may be used to transmit one or more transport blocks. A PDSCH may be used to transmit one or more transport blocks for a DL-SCH. A PDSCH may be used to convey one or more transport blocks. A PDSCH may be used to convey one or more transport blocks for a DL-SCH. One or more transport blocks may be arranged in a PDSCH. One or more transport blocks which corresponds to a DL-SCH may be arranged in a PDSCH. The base station device 3 may transmit a PDSCH. The terminal device 1 may receive the PDSCH.

Downlink reference signals may correspond to a set of resource elements. The downlink reference signals may not carry the information generated in the higher layer. The downlink reference signals may be physical signals used in the downlink component carrier. A downlink physical signal may be transmitted by the base station device 3. The downlink physical signal may be transmitted by the terminal device 1. In the wireless communication system according to one aspect of the present embodiment, at least a part or all of an SS (Synchronization signal), DL DMRS (DownLink DeModulation Reference Signal), CSI-RS (Channel State Information-Reference Signal), and DL PTRS (DownLink Phase Tracking Reference Signal) may be used.

The terminal device may determine, based on the channel bandwidth, at least a part or all of transmission power, output power dynamics, transmit signal quality and spectrum emission mask.

Figure 12:
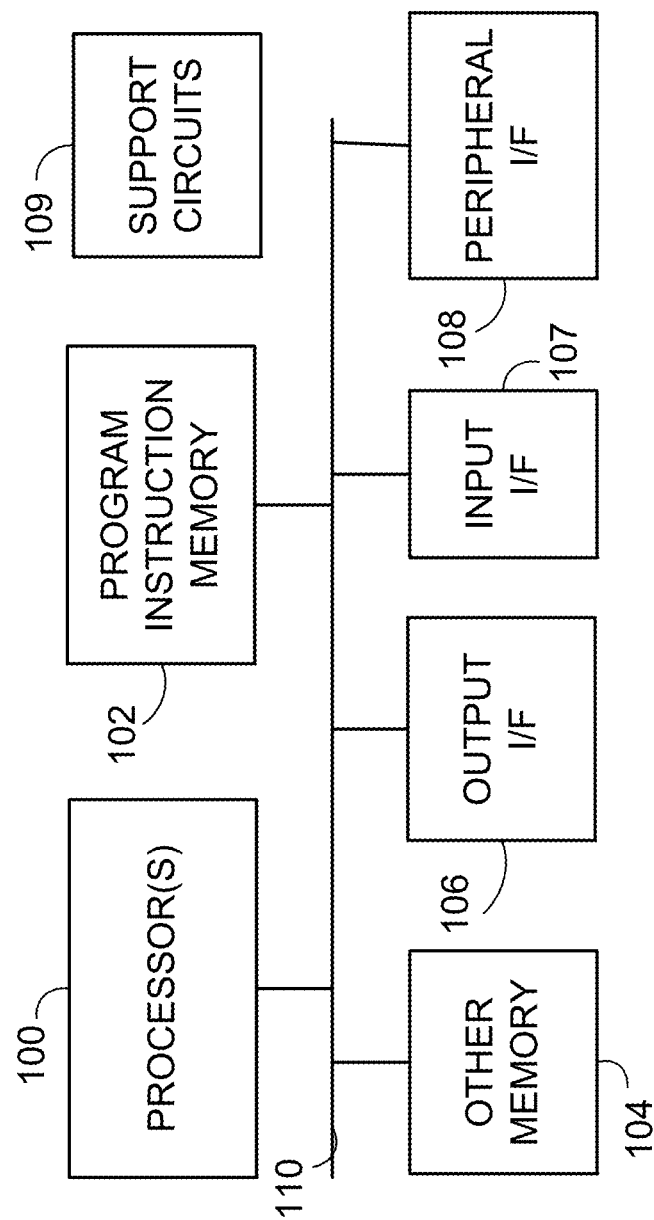
FIG. 12 is a diagrammatic view showing example elements comprising electronic machinery which may comprise a wireless terminal, a radio access node, and a core network node according to an example embodiment and mode.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C Certain units and functionalities of the systems 20 may be implemented by electronic machinery. For example, electronic machinery may refer to the processor circuitry described herein, such as terminal processor circuitry 60 and base station processor 34. Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites. With these understandings, FIG. 12 shows an example of electronic machinery, e.g., processor circuitry, as comprising one or more processors 100, program instruction memory 102; other memory 104 (e.g., RAM, cache, etc.); input/output interfaces 106 and 107, peripheral interfaces 108; support circuits 109; and busses 110 for communication between the aforementioned units. The processor(s) 100 may comprise the processor circuitries described herein, for example, terminal processor circuitry 60 and node processor circuitry 34, or any processor(s) of a network entity of the core network.

A memory or register described herein may be depicted by memory 104, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 109 are coupled to the processors 100 for supporting the processor in a conventional manner. These circuits include cache, power supplies, clock circuits, input/output circuitry and subsystems, and the like.

The term "configured" may relate to the capacity of a device whether the device is in an operational or non-operational state. Configured may also refer to specific settings in a device that effect the operational characteristics of the device whether the device is in an operational or nonoperational state. In other words, the hardware, software, firmware, registers, memory values, and/or the like may be "configured" within a device, whether the device is in an operational or nonoperational state, to provide the device with specific characteristics.

An interface may be a hardware interface, a firmware Interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminals and nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves reception and transmission in a telecommunications system, such as by mitigating cross link interference, for example.

One or more of the following documents may be pertinent to the technology disclosed herein (all of which are incorporated herein by reference in their entirety):

RP-213591, New SI: Study on evolution of NR duplex operation

R1-1910603, On wideband operation in NR-U

3GPP TS38.211, v16.8.0, NR; Physical channels and modulation

3GPP TS38.212, v16.8.0, NR; Multiplexing and channel coding

3GPP TS38.213, v16.8.0, NR; Physical layer procedures for control

3GPP TS38.214, v16.8.0, NR; Physical layer procedures for data

3GPP TS38.321, v16.7.0, NR; Medium Access Control (MAC) protocol specification

3GPP TS38.331, v16.7.0, NR; Radio Resource Control (RRC); Protocol specification 3GPP TS38.101-1, v16.11.0, NR; User Equipment (UE) radio transmission and reception Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A wireless terminal of a cellular telecommunication system, the wireless terminal comprising:
    control circuitry configured:
        to manage a first subset within frequency resources of a serving cell and a second subset which is different from the first subset wherein the second subset is within the frequency resources of the serving cell; and
        to associate the first subset with a first TDD pattern and to associate the frequency resources with a second TDD pattern which is different from the first TDD pattern; and
    transmission circuitry configured:
        to determine whether to transmit a signal on the first subset within the frequency resources based on the first TDD pattern; and
        to determine whether to transmit the signal on the second subset within the frequency resources based on the second TDD pattern;
    wherein:
        the first TDD pattern is provided by a first RRC configuration,
        the second TDD pattern is provided by a second RRC configuration, and
        the first subset is provided by a third RRC configuration.

2. A method in a wireless terminal of a cellular telecommunication system, the method comprising:
    managing, by control circuitry of the wireless terminal, a first subset within frequency resources of a serving cell a second subset which is different from the first subset wherein the second subset is within the frequency resources of the serving cell; and
    associating, by control circuitry of the wireless terminal, the first subset with a first TDD pattern and associating the frequency resources with a second TDD pattern which is different from the first TDD pattern;
    determining, by transmission circuitry comprising of the wireless terminal, whether to transmit a signal on the first subset within the frequency resources based on the first TDD pattern; and
    determining, by transmission circuitry of the wireless terminal, whether to transmit a signal on the second subset within the frequency resources based on the second TDD pattern;
    wherein:
        the first TDD pattern is provided by a first RRC configuration,
        a second TDD pattern is provided by a second RRC configuration, and
        the first subset is provided by a third RRC configuration.

3. A base station of a cellular telecommunication system, the base station comprising:
    control circuitry configured:
        to manage a first subset within frequency resources of a serving cell and a second subset which is different from the first subset wherein the second subset is within the frequency resources of the serving cell; and
        to associate the first subset with a first TDD pattern and to associate the frequency resources with a second TDD pattern which is different from the first TDD pattern; and
    transmission circuitry configured:
        to determine whether to transmit a signal on the first subset within the frequency resources based on the first TDD pattern; and
        to determine whether to transmit the signal on the second subset within the frequency resources based on the second TDD pattern;

wherein:
the first TDD pattern is provided by a first RRC configuration,
the second TDD pattern is provided by a second RRC configuration, and
the first subset is provided by a third RRC configuration.

* * * * *